(12) United States Patent
Arlt et al.

(10) Patent No.: US 9,021,910 B2
(45) Date of Patent: May 5, 2015

(54) BALL-SCREW ASSEMBLY ISOLATOR HAVING COMPRESSIBLE MEMBERS

(75) Inventors: George E. Arlt, Midland, MI (US); David P. Holm, Brant, MI (US); Troy P. Strieter, Sebewaing, MI (US); James J. Shavrnoch, Frankenmuth, MI (US); Bryan G. Freed, Rapid River, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 245 days.

(21) Appl. No.: 13/587,990

(22) Filed: Aug. 17, 2012

(65) Prior Publication Data

US 2014/0047936 A1   Feb. 20, 2014

(51) Int. Cl.

| | |
|---|---|
| *F16C 33/66* | (2006.01) |
| *F16C 27/00* | (2006.01) |
| *F16H 3/06* | (2006.01) |
| *F16H 27/02* | (2006.01) |
| *F16H 29/02* | (2006.01) |
| *F16H 29/20* | (2006.01) |
| *F16H 35/00* | (2006.01) |
| *F16H 1/24* | (2006.01) |
| *F16H 55/02* | (2006.01) |
| *B62D 3/08* | (2006.01) |
| *F16H 25/24* | (2006.01) |
| *F16H 57/00* | (2012.01) |
| *F16H 25/22* | (2006.01) |

(52) U.S. Cl.
CPC .............. *B62D 3/08* (2013.01); *F16H 25/2204* (2013.01); *F16H 25/24* (2013.01); *F16H 57/0006* (2013.01); *Y10T 74/18576* (2015.01); *Y10T 74/19744* (2015.01)

(58) Field of Classification Search
CPC . F16H 25/2204; F16H 25/24; F16H 57/0006; B62D 3/08
USPC ................ 74/424.81, 424.82, 388 PS, 89.23; 188/444; 384/510, 517, 535, 536, 540
See application file for complete search history.

(56) References Cited

U.S. PATENT DOCUMENTS

| | | | |
|---|---|---|---|
| 4,572,314 A * | 2/1986 | Anguera ........................ | 180/444 |
| 4,718,781 A * | 1/1988 | Gerard ........................... | 384/495 |
| 5,083,626 A * | 1/1992 | Abe et al. ..................... | 180/445 |
| 6,186,268 B1 * | 2/2001 | Onodera et al. .............. | 180/444 |
| 2004/0045386 A1 * | 3/2004 | Saruwatari et al. ......... | 74/388 PS |
| 2011/0220432 A1 * | 9/2011 | Bugosh et al. ................ | 180/444 |
| 2013/0248280 A1 * | 9/2013 | Stamm et al. ................. | 180/444 |

* cited by examiner

*Primary Examiner* — Justin Krause
(74) *Attorney, Agent, or Firm* — Cantor Colburn LLP

(57) ABSTRACT

A ball-screw assembly isolator is provided, and includes a housing; a ball-screw, a bearing assembly, a retaining member, a first compressible member and a second compressible member. The bearing assembly is located between the housing and the ball-screw. The bearing assembly includes an outer race. The retaining member is secured by the housing. The first compressible member is positioned between the housing and the outer race. The second compressible member is positioned between the outer race and the retaining member. The retaining member is configured to be preloaded to exert an axial force upon the first compressible member and the second compressible member.

7 Claims, 3 Drawing Sheets

BALL-SCREW ASSEMBLY ISOLATOR HAVING COMPRESSIBLE MEMBERS

BACKGROUND OF THE INVENTION

The present invention relates to a ball-screw assembly isolator, and more particularly to a ball-screw assembly isolator having a retaining member exerting an axial force in an axial direction upon a first compressible member and a second compressible member.

Electrically assisted steering systems may produce noise as the rotary motion of a motor is converted into linear motion by a ball-nut assembly. However, the steering system may need to meet specific noise level requirements. Thus, the noise created by the ball-nut assembly may need to be reduced. In one approach to reduce the amount of noise created by the ball-nut assembly, an elastomeric material may be provided, which surrounds the nut of the ball-nut assembly. The elastomeric material is used not only as a noise suppressor, but also as a torque drive system. While the elastomeric material generally provides adequate noise suppression, sometimes the elastomeric material may slip during relatively heavy loading. The noise suppressor may also be susceptible to contaminants.

SUMMARY OF THE INVENTION

According to one aspect of the invention, a ball-screw assembly isolator is provided and includes a housing, a ball-screw, a bearing assembly, a retaining member, a first compressible member and a second compressible member. The bearing assembly is located between the housing and the ball-screw. The bearing assembly includes an outer race. The retaining member is secured by the housing. The first compressible member is positioned between the housing and the outer race. The second compressible member is positioned between the outer race and the retaining member. The retaining member is configured to be preloaded to exert an axial force upon the first compressible member and the second compressible member.

According to another aspect of the invention, a ball-screw assembly isolator is provided and includes a housing, a ball-screw, a ball-screw nut, a bearing assembly, a retaining member, a second retaining member, a first compressible member and a second compressible member. The bearing assembly is located between the housing and the ball-screw. The bearing assembly includes an inner race and an outer race. The retaining member is secured by the housing. The second retaining member is secured to the ball-screw nut. The first compressible member positioned between the housing and the outer race. The second compressible member is positioned between the outer race and the retaining member. The retaining member is configured to be preloaded to exert an axial force upon the first compressible member and the second compressible member.

According to yet another aspect of the invention, a steering system is provided, and includes a rack assembly and a ball-screw assembly isolator having a ball screw in communication with the rack assembly. The ball-screw assembly includes a housing, a ball-screw, a bearing assembly, a retaining member, a first compressible member and a second compressible member. The bearing assembly is located between the housing and the ball-screw. The bearing assembly includes an outer race. The retaining member is secured by the housing. The first compressible member is positioned between the housing and the outer race. The second compressible member is positioned between the outer race and the retaining member. The retaining member is configured to be preloaded to exert an axial force upon the first compressible member and the second compressible member.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
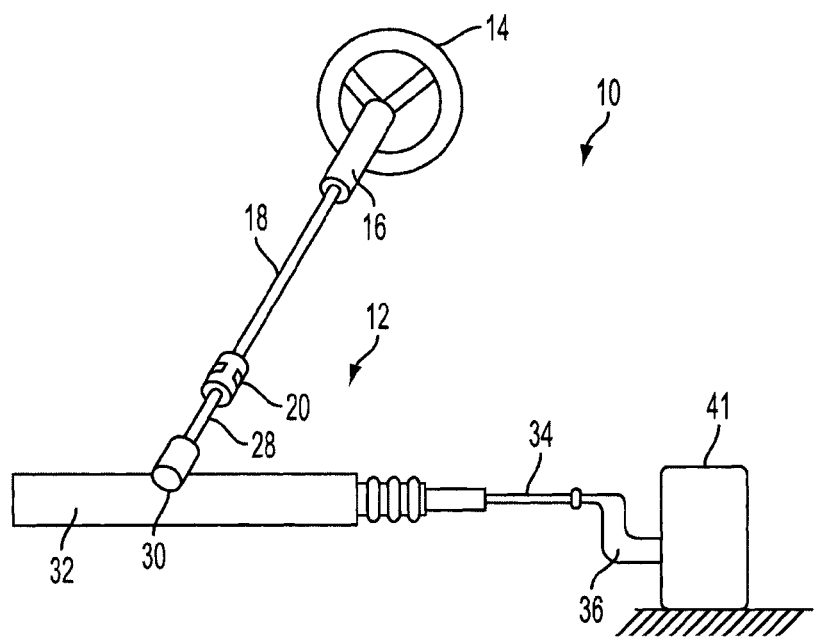
FIG. 1 is an illustration of a steering system for a vehicle in accordance with an exemplary embodiment of the invention.

Referring now to FIG. 1, where the invention will be described with reference to specific embodiments without limiting same, an exemplary embodiment of a vehicle 10 including a steering system 12 is illustrated. In various embodiments, the steering system 12 includes a handwheel 14 coupled to a steering column 16. The steering column 16 includes an upper steering shaft 18 and a lower steering shaft 28, where a column universal joint 20 couples the upper steering shaft 18 to the lower steering shaft 28. The lower steering shaft 28 is secured to a gear housing 30. The gear housing 30 includes a pinion gear 38 (shown in FIG. 2). The pinion gear 38 is in communication with a rack assembly 32. The rack assembly 32 is coupled to a pair of the vehicle's road wheels 41 (one road wheel 41 is shown in FIG. 1) by a tie rod 34 and a steering knuckle 36.

Figure 2:
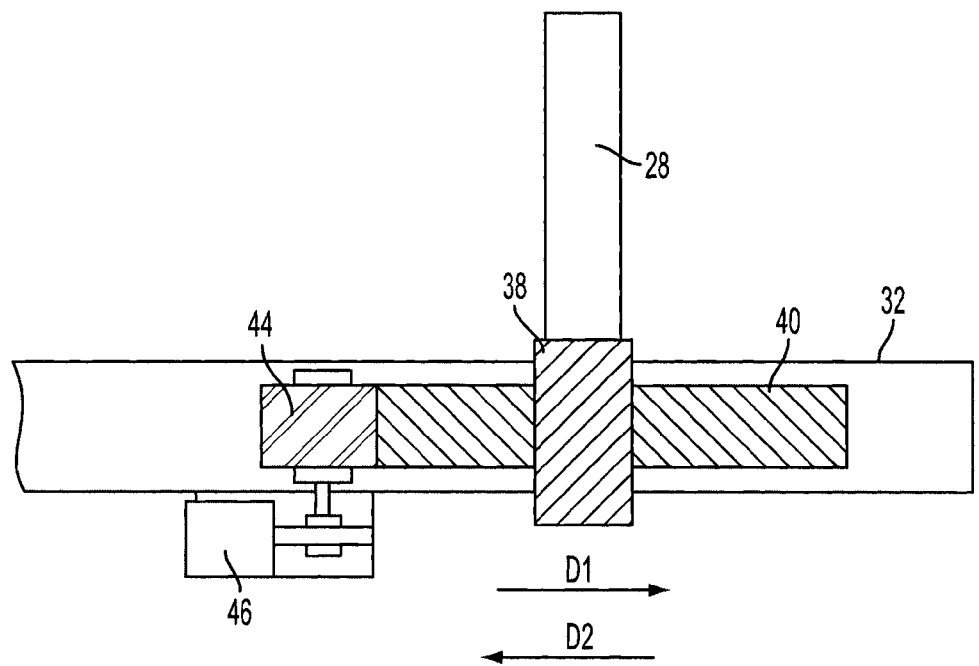
FIG. 2 is an illustration of a portion of the steering system in FIG. 1, in accordance with another exemplary embodiment of the invention.

Referring now to FIGS. 1 and 2, the pinion gear 38 may engage with a toothed portion 40 of the rack assembly 32. The toothed portion 40 of the rack assembly 32 is integrated with a ball-screw 44, where the ball-screw 44 is in communication with a motor 46. Thus, if an operator of the vehicle 10 rotates the handwheel 14, a rotational force is exerted on the steering column 16, and the pinion gear 38 is rotated accordingly. The rotation of the pinion gear 38 creates movement of the rack assembly 32 in the either a first direction D1 or a second direction D2, which in turn manipulates the tie rods 34 and knuckles 36 to reposition the road wheels 41. In order to assist an operator with rotation of the handwheel 14, the motor 46 is energized and provides power assist to the movement of the rack assembly 32 through the ball-screw 44.

Figure 3:
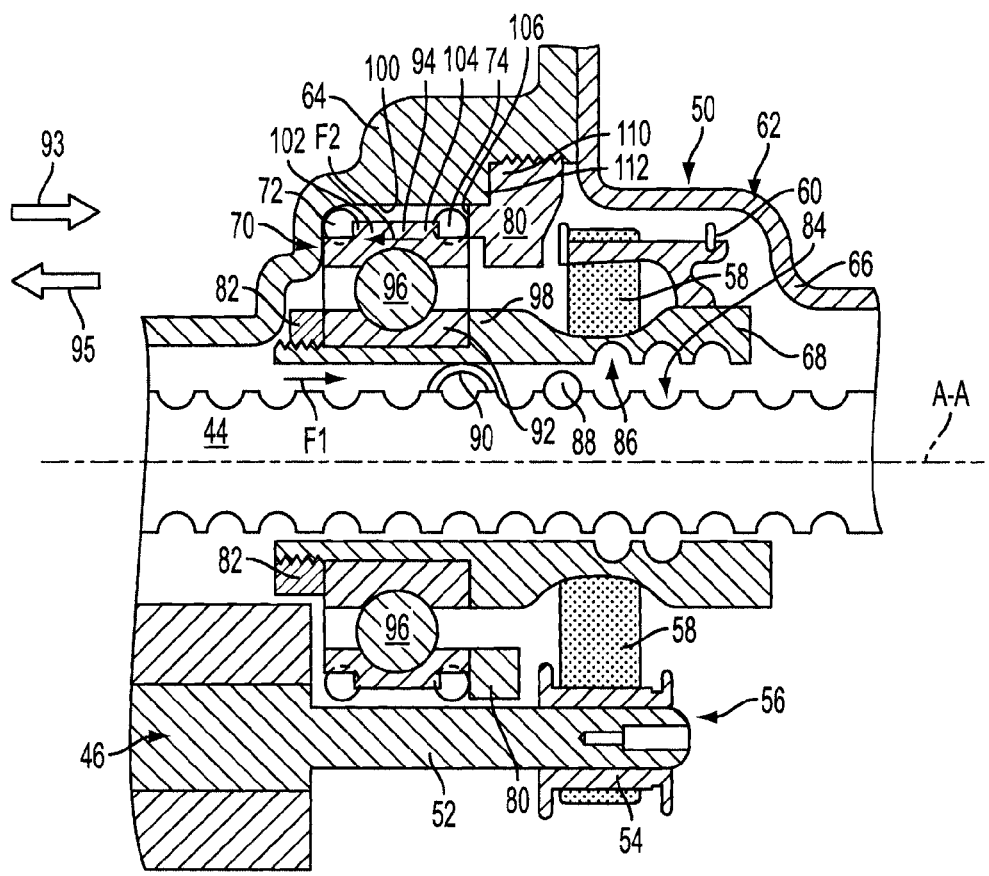
FIG. 3 is a cross-sectional view of a ball-screw assembly isolator, in accordance with yet another exemplary embodiment of the invention.

With reference to FIGS. 2-3, the motor 46 is in operable communication with a ball-screw assembly isolator 50. The motor 46 includes a shaft 52 and a driving pulley 54 that is fixedly attached to a distal end 56 of the shaft 52. A belt 58 is wrapped around the driving pulley 54 as well as a driven pulley 60 of the ball-screw assembly isolator 50.

The ball-screw assembly 50 is contained within a housing 62. Specifically, in the exemplary embodiment as shown, the housing 62 includes an inboard shell 64 and an outboard shell 66. The ball-screw assembly 50 includes the ball-screw 44, a ball-screw nut 68, a bearing assembly 70, a first compressible member 72, a second compressible member 74, a first retaining member 80 and a second retaining member 82. The first compressible member 72 and the second compressible member 74 may be constructed from a generally compressible or elastic material such as, for example, an elastomer or rubber. Specifically, for example, in one approach the first compressible member 72 and the second compressible member 74 are constructed from a fluorocarbon elastomer. In one embodiment, the first compressible member 72 and the second compressible member 74 are O-rings, however, it is to be understood that the first compressible member 72 and the second compressible member 74 may include other configurations as well (and are illustrated in FIG. 5B).

The ball-screw 44 includes a threaded shaft portion 84 and the ball-screw nut 68 includes a threaded nut portion 86. The threaded shaft portion 84 and the threaded nut portion 86 cooperate together to create a helical raceway for receiving at least one ball bearing 88, as well as a ball return mechanism 90. In one exemplary embodiment, the ball return mechanism 90 may be constructed of a plastic material.

The bearing assembly 70 includes an inner race 92, an outer race 94, and a bearing ball 96 located between the inner race 92 and the outer race 94. The inner race 92 is positioned closer to a rotational axis A-A of the ball-screw assembly 50 when compared to the outer race 94. In the embodiment as shown, a portion of the inner race 92 abuts against a shoulder 98 of the ball-screw nut 68. Specifically, the second retaining member 82 exerts an axial force Fl in an outboard direction 93, thereby compressing the inner race 92 against the shoulder 98 of the ball-screw nut 68. In the exemplary embodiment as shown in FIG. 3, the second retaining member 82 is threadingly engaged with the ball-screw nut 68, however it is understood that other approaches may be used as well to secure the second retaining member 82 with the ball-screw nut 68.

Figure 4:
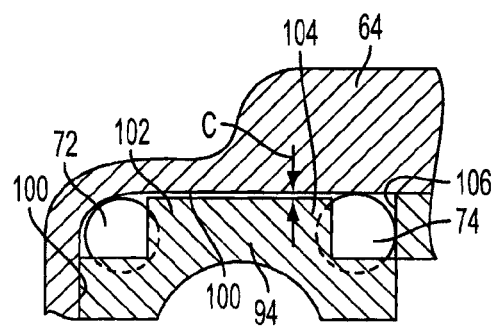
FIG. 4 is an enlarged view of a portion of the ball-screw assembly shown in FIG. 3, in accordance with another exemplary embodiment of the invention.

Referring now to both FIGS. 3-4, a radial clearance C (shown in FIG. 4) is located between the outer race 94 and an inner surface 100 of the inboard shell 64. The radial clearance C allows for mobility of the ball-screw assembly 50 within the housing 62 during operation. In particular, the radial clearance C may allow the the bearing assembly 70 to radially rotate or tip in the axial direction (e.g., transverse to the rotational axis A-A) during operation.

The first retaining member 80 is assembled to a preloaded position. That is, the first retaining member 80 is positioned to exert a second axial force F2 in an inboard direction 95, thereby compressing the first compressible member 72 and the second compressible member 74, where the second axial force F2 generally opposes the first axial force F1. Specifically, the first compressible member 72 is compressed between the inner surface 100 of the inboard shell 64 and a first shoulder 102 of the outer race 94. The second compressible member 74 is compressed between a second shoulder 104 of the outer race 94 and a surface 106 of the first retaining member 80. In the exemplary embodiment as shown in FIG. 3, the first retaining member 80 is threadingly engaged with the inboard shell 64, however it is understood that other approaches may be used as well to secure the first retaining member 80 with the inboard shell 64. In one approach, a shoulder 110 of the first retaining member 80 abuts against a shoulder 112 of the inboard shell 64, thereby preloading the first retaining member 80 against the inboard shell 64.

As seen in FIGS. 3-4 the first retaining nut 80, the second retaining nut 82, the first compressible member 72 and the second compressible member 74 position the bearing assembly 70 within the housing 62 in the radial direction (e.g., to create the clearance C as shown in FIG. 4) as well as the axial direction (e.g., where the first compressible member 72 and the second compressible member 74 act as spacers between the outer race 94 and the inboard shell 64). The first compressible member 72 and the second compressible member 74 also act as sound absorbers. Specifically, noise may be created as the ball bearing 88 moves in the helical raceway between the threaded shaft portion 84 and the threaded nut portion 86. The elastomeric material of the first compressible member 72 and the second compressible member 74 reduce the sound created by movement of the ball bearing 88. The first compressible member 72 and the second compressible member 74 may also allow for a larger range of tolerances within the ball-screw assembly 50. By allowing a larger range of tolerances, the ball-screw assembly 50 may have an additional degree of freedom, thereby facilitating a larger tolerance range during assembly. By providing the additional degree of freedom the force required to backdrive the threaded shaft portion 84 (shown in FIG. 3) is reduced. Also, the ball-screw assembly 50 as described may result in a less complex design (e.g., by eliminating a bearing assembly), more compact packaging, and a reduced amount of elastomeric material when compared to some other types of ball-screw assemblies that are currently available.

Figure 5A:
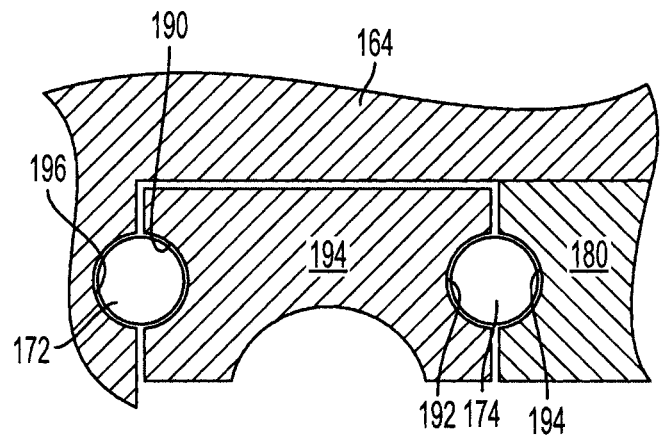
FIGS. 5A-5B are alternative embodiments of the ball-screw assembly shown in FIG. 3, in accordance with yet another exemplary embodiment of the invention.
Figure 5B:
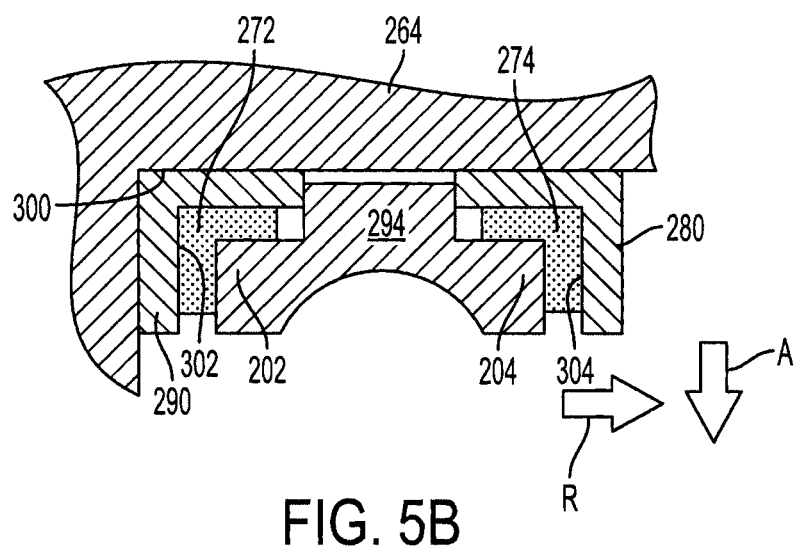

FIGS. 5A-5B are alternative embodiments of the bearing assembly 70. Specifically, FIG. 5A is an illustration of an outer race 194 having a first recess 190 for receiving a portion of a first compressible member 172 and a second recess 192 for receiving a portion of a second compressible member 174. In the embodiment as shown in FIG. 5A, a first retaining member 180 may also include a recess 194 for receiving a portion of the second compressible member 174. Also, a portion of the inboard shell 164 may also include a recess 196 for receiving a portion of the first compressible member 172. In the exemplary embodiment as shown in FIG. 5A, the first compressible member 172 and the second compressible member 174 are O-rings, however it is to be understood that the first compressible member 172 and the second compressible member 174 may include other configurations as well.

FIG. 5B is yet another illustration of an outer race 294. In the embodiment as shown in FIG. 5B, two retaining members 280 and 290 are provided to secure a first compressible member 272 and a second compressible member 274. Specifically, the retaining member 290 abuts against an inner surface 300 of an inboard shell 264. The first compressible member 272 is positioned between a first shoulder 202 of the outer race 294 and an inner surface 302 of the retaining member 290. In the embodiment as shown in FIG. 5B, the first compressible member 272 is shaped to abut against the first shoulder 202 of the outer race 294 in both a radial direction R as well as an axial direction A. The first compressible member 272 includes a generally L-shaped profile in cross-section, and is a ring having a radially inwardly extending flange. The retaining member 290 includes a cross-section that generally coincides with the L-shaped profile of the first compressible member 272.

The second compressible member 274 is positioned between a second shoulder 204 of the outer race 294 and an inner surface 304 of the retaining member 280. The second compressible member 274 is shaped to abut against the second shoulder 204 of the outer race 294 in both the radial direction R and the axial direction A. Similar to the first compressible member 272, the second compressible member

274 may also include a generally L-shaped profile in cross-section. The retaining member 280 includes a profile that generally coincides with the L-shaped profile in cross-section of the second compressible member 274.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A ball-screw assembly isolator, comprising:
a housing;
a ball-screw;
a bearing assembly located between the housing and the ball-screw, the bearing assembly including an outer race;
a retaining member secured by the housing;
a first compressible member positioned between the housing and the outer race;
a second compressible member positioned between the outer race and the retaining member, the retaining member configured to be preloaded to exert an axial force upon the first compressible member and the second compressible member;
a ball-screw nut and a second retaining member that are located within the housing, wherein the second retaining member is secured to the ball-screw nut;
wherein the bearing assembly includes an inner race, and wherein the second retaining member exerts a second axial force to compress the inner race against the ball-screw nut; and
wherein the axial force exerted by the retaining member generally opposes the second axial force exerted by the second retaining member.

2. The ball-screw assembly isolator of claim 1, wherein the ball-screw nut includes a ball-screw nut shoulder, and wherein the inner race is compressed against the ball-screw nut shoulder.

3. The ball-screw assembly isolator of claim 1, wherein the first compressible member and the second compressible member are constructed from a fluorocarbon elastomer.

4. The ball-screw assembly isolator of claim 1, wherein the retaining member is threadingly engaged with the housing.

5. The ball-screw assembly isolator of claim 1, wherein the outer race includes a first recess for receiving a portion of the first compressible member and a second recess for receiving a portion of the second compressible member.

6. The ball-screw assembly isolator of claim 1, wherein the first compressible member and the second compressible member are both shaped to abut against the outer race in a radial direction and the axial direction.

7. A steering system, comprising:
a rack assembly;
a ball-screw assembly isolator having a ball screw in communication with the rack assembly, comprising:
a housing;
a ball-screw;
a ball-screw nut;
a bearing assembly located between the housing and the ball-screw, the bearing assembly including an inner race and an outer race;
a first retaining member secured by the housing;
a second retaining member secured to the ball-screw nut;
a first compressible member positioned between the housing and the outer race; and
a second compressible member positioned between the outer race and the retaining member, the first retaining member configured to be preloaded to exert a first axial force upon the first compressible member and the second compressible member, the second retaining member configured to exert a second axial force to compress the inner race against the ball-screw nut,
wherein the first axial force exerted by the first retaining member generally opposes the second axial force exerted by the second retaining member.

* * * * *